(12) United States Patent
Nicholls et al.

(10) Patent No.: US 6,773,263 B2
(45) Date of Patent: Aug. 10, 2004

(54) MEDICAL SIMULATOR

(76) Inventors: Robert J. Nicholls, 59 Woodington La., Berkeley Springs, WV (US) 25411; Michael A. Stahlnecker, 3901 Arbor Crest Way, Rockville, MD (US) 20853; John M. Mueller, 717 Rose Hurst Way, Lexington, KY (US) 40515

(*) Notice: Subject to any disclaimer, the term of this patent is extended or adjusted under 35 U.S.C. 154(b) by 0 days.

(21) Appl. No.: 09/972,621

(22) Filed: Oct. 9, 2001

(65) Prior Publication Data

US 2003/0068606 A1 Apr. 10, 2003

(51) Int. Cl.⁷ .................................. G09B 23/28
(52) U.S. Cl. ................... 434/267; 434/268; 434/272
(58) Field of Search .................. 434/262, 267, 434/268, 265, 270, 272

(56) References Cited

U.S. PATENT DOCUMENTS

| | | |
|---|---|---|
| 3,520,071 A | 7/1970 | Abrahamson |
| 4,561,851 A | 12/1985 | Ferreira |
| 4,570,640 A | 2/1986 | Barsa |
| 4,642,055 A * | 2/1987 | Saliterman ............... 434/268 |
| 4,853,521 A | 8/1989 | Claeys |
| 4,907,973 A | 3/1990 | Hon |
| 4,932,879 A | 6/1990 | Ingenito |
| 5,385,474 A | 1/1995 | Brindle |
| 5,509,810 A | 4/1996 | Schertz |
| 5,766,016 A * | 6/1998 | Sinclair ................... 434/262 |
| 5,772,443 A | 6/1998 | Lampotang |
| 5,800,179 A * | 9/1998 | Bailey .................... 434/262 |
| 6,126,450 A | 10/2000 | Mukai |
| 6,190,177 B1 | 2/2001 | Thu |
| 6,193,519 B1 | 2/2001 | Eggert |
| 6,273,728 B1 * | 8/2001 | van Meurs ............... 434/268 |
| 6,443,735 B1 * | 9/2002 | Eggert .................... 434/262 |
| 6,470,302 B1 * | 10/2002 | Cunningham ............. 703/7 |

* cited by examiner

Primary Examiner—Kurt Fernstrom

(57) ABSTRACT

An apparatus and associated method for simulating anatomic and physiological responses to medical procedures involving administering regional anesthetic/analgesic agent in real time using a mannequin. Such simulation allows trainees to perform regional anesthesia techniques that closely mimic real world medical procedures before performing procedures on live patients.

7 Claims, 5 Drawing Sheets

MEDICAL SIMULATOR

FIELD OF THE INVENTION

This invention relates to medical simulators. The invention is particularly concerned with the provision of a medical simulator designed to teach and to refine the psychomotor skills associated with the medical procedures of administering regional and local anesthetic and analgesic agents.

The particular form of medical simulator hereinafter described is designed specifically for the use by medical personnel learning or refining the skills of regional anesthesia. Further it is particularly designed for those procedures where observing the reaction of the nervous system to electrical stimulation allows for accurate placement of anesthesia or analgesic agents.

The invention also relates to simulation systems designed to simulate any procedure that requires any device that is conductive to puncture the skin or enter the body through a natural or unnatural orifice, e.g., brachytherapy. The invention is further not limited to simulation of human anatomy, i.e., veterinary procedures can be supported.

BACKGROUND OF THE INVENTION

The procedure of regional anesthesia involves knowledge of the anatomy of the relevant parts of the human nervous system, the response of the human nervous system to either direct pressure or electrical stimulation and the pharmacology of local anesthesia. Further, recent techniques also require familiarity with electrical equipment that produces a controllable current at the tip of a surgical needle so that specific parts of the nervous system can be stimulated.

The techniques associated with administering anesthesia are extremely difficult to learn and to perform. These techniques require the anaesthetist to recognize the tactile feel of various anatomical landmarks, e.g., ligaments, and to recognize specific motor response to stimulation by applying pressure or electrical current or both to a needle once it is in the proximity of the desired location. This motor response is typically the movement of a small muscle group that manifests itself as movement of a particular part of the body e.g. flexing of the wrist. The magnitude of this movement is directly proportional to the amplitude of the electrical current at the needle tip and the proximity of the needle tip to the stimulated nerve.

Traditional training methods have required that the anesthetist learn these procedures by observation and by practicing the procedure directly on a live patient. The current training methods inevitably results in novice anesthetist error and resulting patient pain or injury.

It is accordingly a specific object of the present invention to provide a medical simulator which can be used to train anesthetists to perform regional anesthesia techniques with an enhanced degree of confidence and experience, particularly when first making the transition from theory to performing the first procedure on a live patient.

An increasing adverse medico-legal climate is making it mandatory for all practicing clinicians to ensure that they have undertaken the necessary practical training before undertaking invasion procedures clinically. It is accordingly a specific object of the present invention to provide a medical simulator which will assist in addressing the need for such training.

SUMMARY OF THE INVENTION

The present invention provides a medical simulator that comprises:

a) a simulation of a part of the human anatomy (e.g., shoulder and partial arm), called a mannequin, into which a needle or other penetrating instrument can be inserted;

b) a sensor system within said simulation part for sensing the position of the tip of the needle and any electrical current or property attributed to it; and c) a display means for displaying a representation of said part of the human anatomy, movement of the tip of the needle and a display of any movement of other parts of the anatomy which result from any electrical current flow through the needle as sensed by the sensor means.

In general the instrument may be a needle, a scalpel, a trocar, a cannula, or a catheter, or any other medical instrument capable of penetrating the mannequin without destroying it. The simulation of the part of the human anatomy may include a replaceable simulated skin outer cover comprising a conductive elastomer, replaceable simulated muscle segments and a replaceable conductive elastomer element containing simulated nerves of conductive elastomer. Different thickness and characteristics of each of the elastomer elements (skin, muscle, nerves) may be provided so that the user can experience different degrees of difficulty in palpating and penetrating the anatomy proximal to the nerve. The simulation of the part of the human anatomy may also include a simulated circulatory system and elements such as an artery or vein, which may contain fluid.

The simulation of the nerve preferably includes a plurality of alternating conductive and insulating layers. The sensor means preferably comprises a network of electrical contacts at each conductive layer or element. Electrical contact with each of these independent layers by means of an electrically charged needle or implement will complete an electrical circuit so that needle location can be evaluated. Measurement of various electrical characteristics (e.g., resistance or capacitance) within the conductive layer can be used to provide additional information (e.g., relative position of contact within the layer or electrical current flow within the layer.)

According to a second aspect of the present invention there is provided a method of training a clinician in the carrying out of medical procedures which include the use of the medical simulator as defined above. The simulator is so designed as to provide a full range of both visual and tactile feedback, which is essential if the simulator is to fill the training vacuum, which currently exists.

DESCRIPTION OF THE PREFERRED EMBODIMENT

Figure 5:
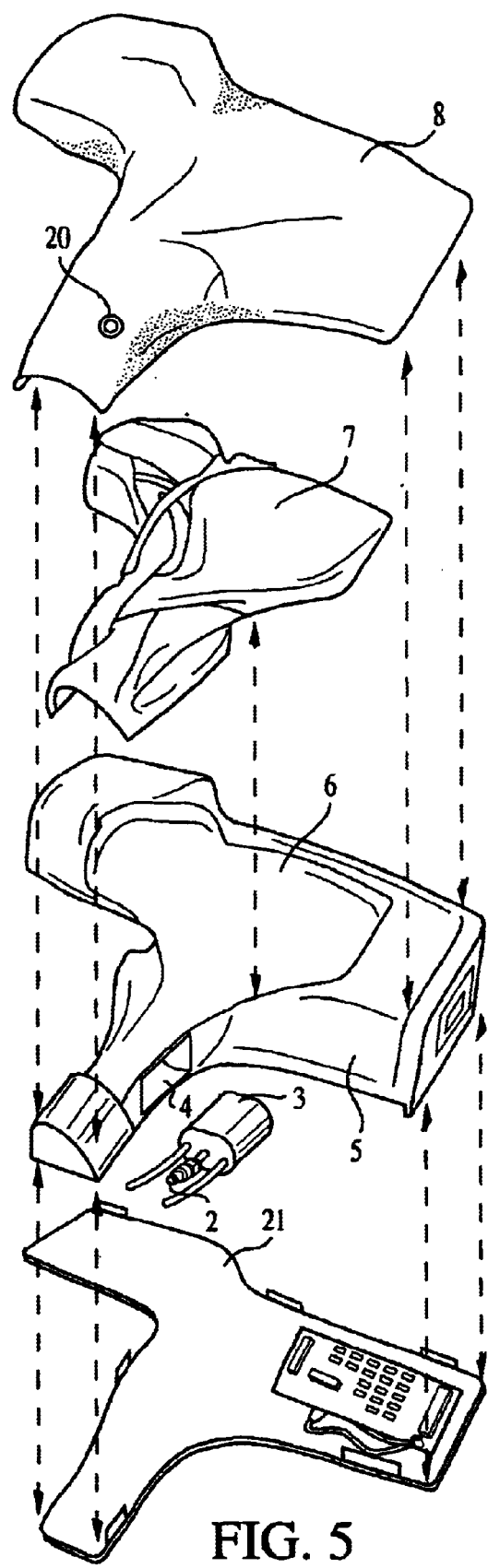
FIG. 5 is a schematic exploded view of a brachial plexus anesthesia simulator.

As shown in FIG. 5, the simulator includes an anatomically shaped, molded segment 5 over which is placed a replaceable conductive, penetrable elastomer skin 8. An electrical contact 20 is attached to or molded within the skin cover 5 and is designed to allow the realistic connection of an electrical stimulator positive terminal and for each of the conductive elements of the simulator, described below, to be connected to the same electrical source.

The conductive simulated outer skin cover 8 comprises a dermis and soft tissue and is formed such that it closely simulates the tactile feel of human skin and fatty tissue. Different skin cover 8 thickness' are provided, designed to provide differing degrees of difficulty in palpating the arteries and nerves contained within the nerve segment 3.

Simulated muscles 7 are placed in recesses 6 within the molded segment 5 and are held in position by the outer skin 8. Replaceable nerve segment 3 and electrical sensor connections 2 are seated within recess 4 and are held in place by the outer skin 8. Sensor connections 2 are connected to the base 21 by means of an electrical connector such as a plug. A hydraulic tube may also be molded within the replaceable nerve segment 6 and can be used, by connection to a pump, to simulate a palpable arterial pulse. Alternative versions of the nerve segment 6 can be fitted interchangeably into the recess 4. Such alternative versions can include, for example, an abnormal distribution of nerves and arteries, thereby increasing the difficulty associated with undertaking the simulated procedure.

The molded segment 5 is fixed to the simulator base 21 by means of screws. Molded segment 5 houses the electrical sensor interface that converts the sensor signals to language that can be interpreted by the display software.

Figure 1:
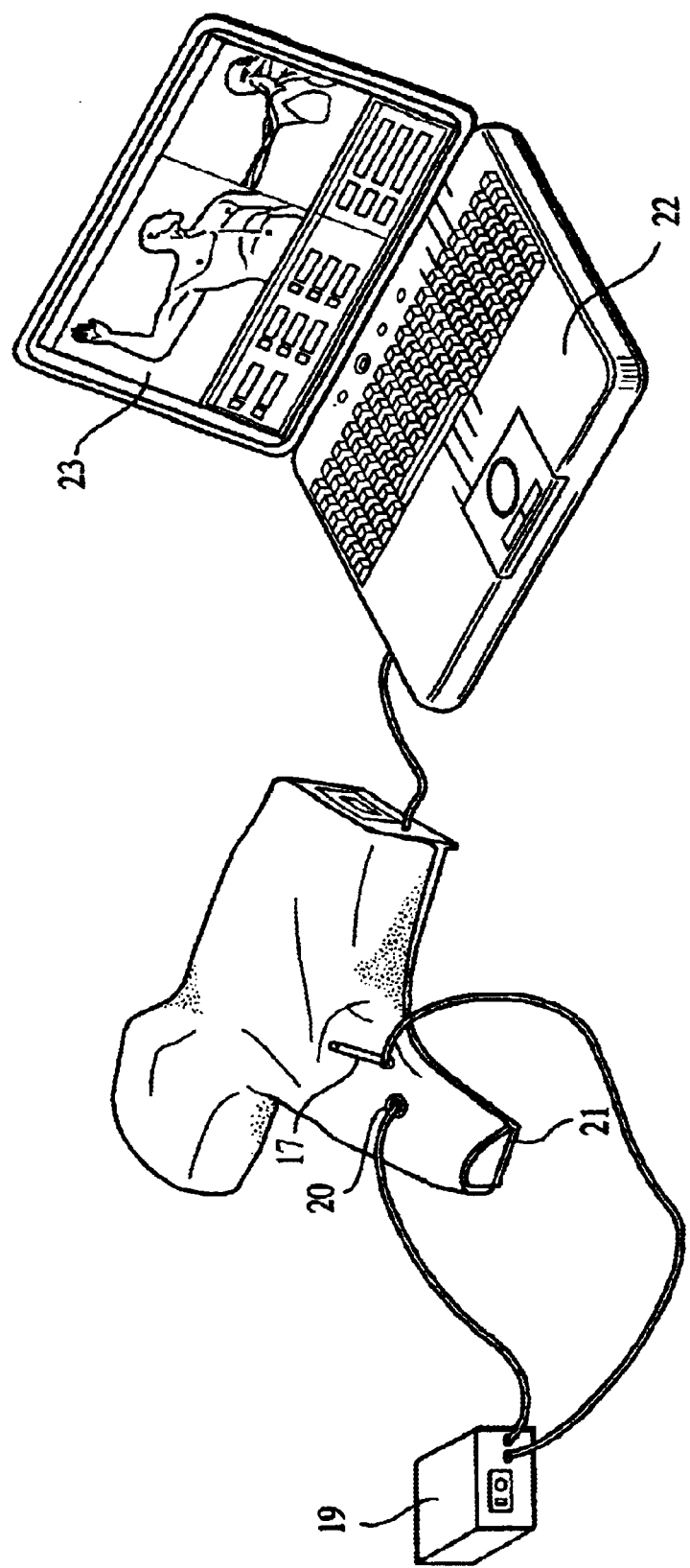
FIG. 1 shows schematically the connection of the anatomical segment to the PC.
Figure 2:
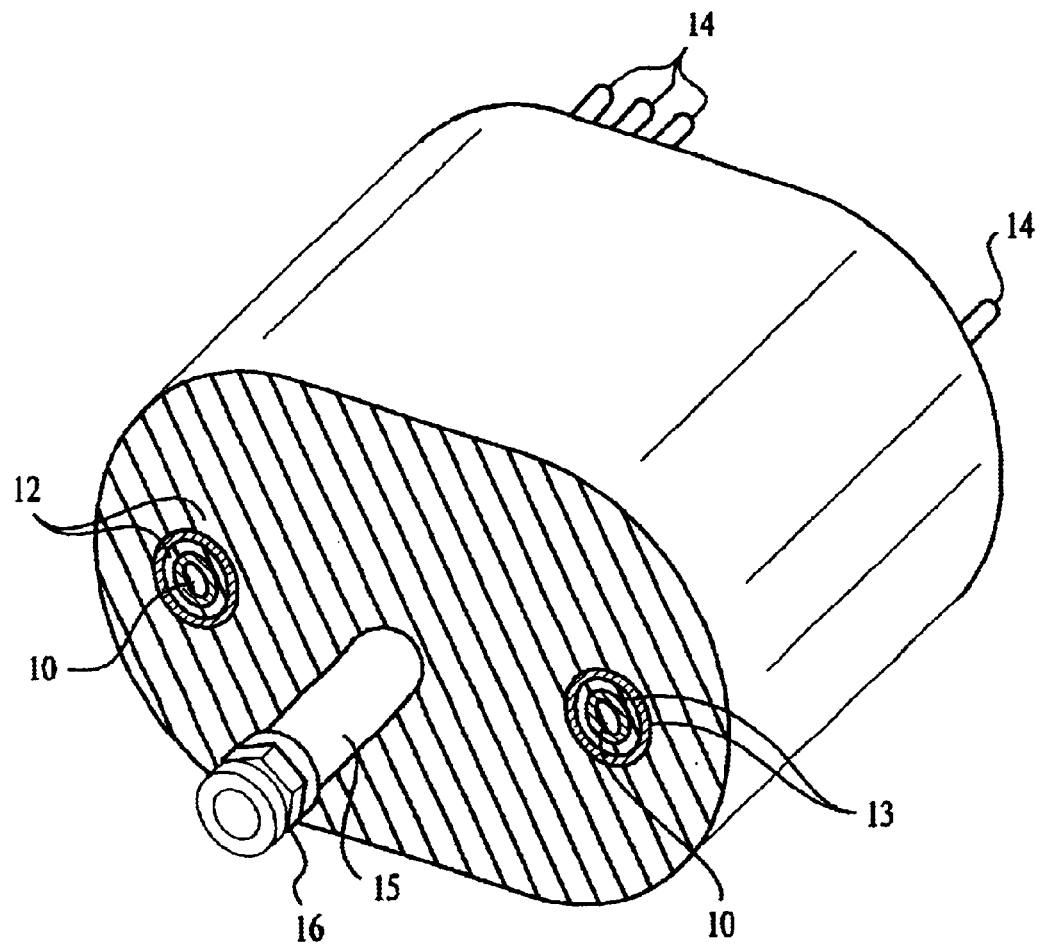
FIG. 2 shows a typical simulated nerve and surrounding tissue in cross section.

Details of the nerves and artery of one particular embodiment, and the relative positions of the conductive and non-conductive layers within the nerve segment 6 illustrated in FIG. 1 are further shown in FIG. 2. The nerves 10 contained within the nerve segment 11 illustrated in FIG. 2 are formed such that there are numerous concentric, penetrable conductive 12 and non-conductive 13 layers. Each concentric conductive layer 12 has an attached or molded electrical contact 14. The electrical contacts 14 are connected to the simulator base 21 and allow the electrical signals to pass from the conductive layers 12 to the sensor interface. The arteries 15 are tubular, penetrable and expandable. They are further designed to allow the passage of fluid to simulate blood flow and an arterial pulse. The arteries 15 also have a hydraulic connector 16 at each end to allow connection to a pump mechanism and the passage of fluid.

Each of the anatomical structures mentioned above is so simulated as to replicate faithfully their physical characteristics, thereby allowing the trainee to understand the psychomotor feedback experience while undertaking clinical procedures, simultaneously viewing the structures and any response to electrical stimulation on the PC screen. The electrical interface connects directly to the parallel, serial IR port, game port, and mouse or USB port of personal computer.

Figure 3:
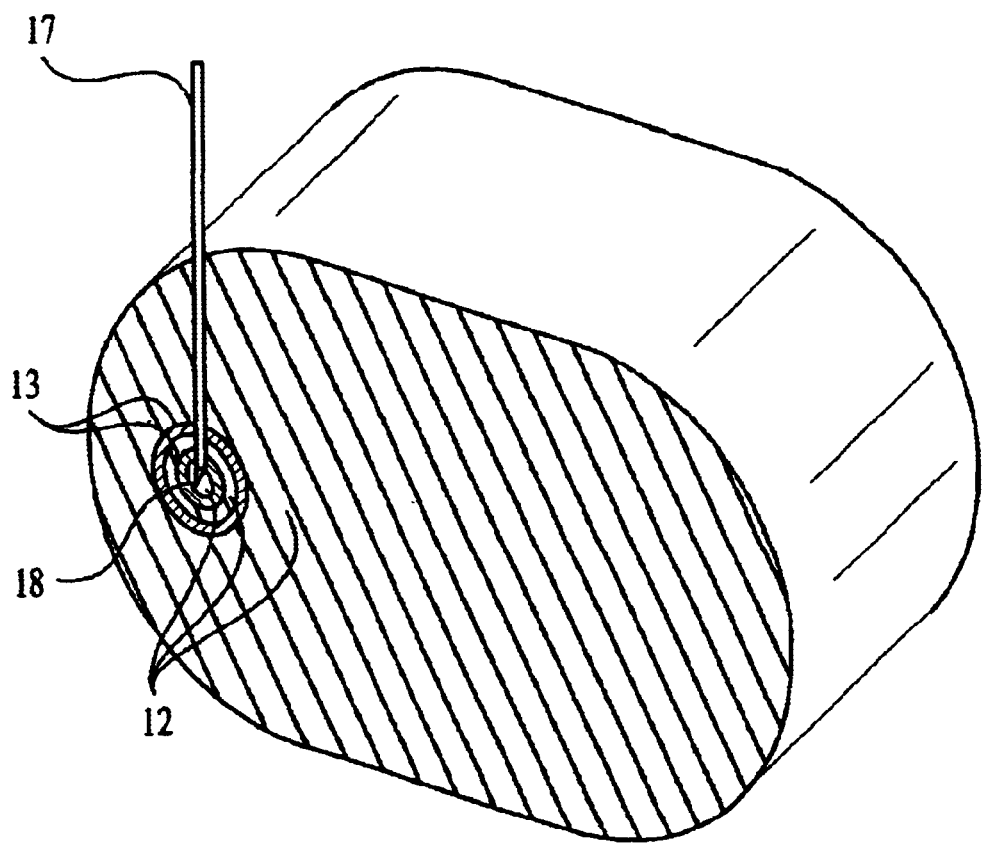
FIG. 3 shows a needle within the structure of FIG. 2 in cross section.
Figure 4:
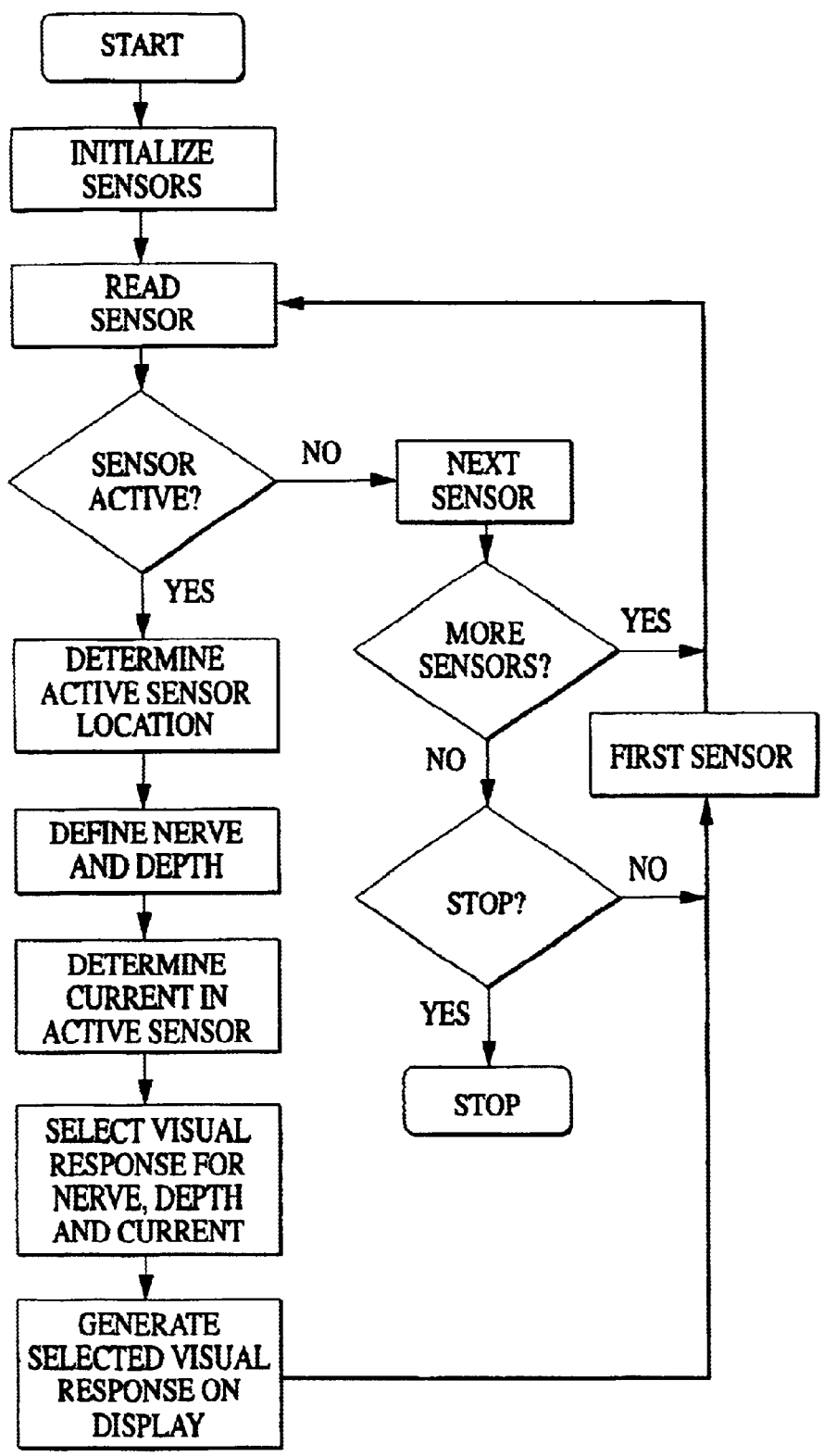
FIG. 4 shows a flow diagram that illustrates the software and display interface algorithm for determining nerve and associated response.

As illustrated in FIG. 3 each of the conductive anatomical layers 12 is penetrable and is separated by at least one non-conductive penetrable layer 13. Detection of penetration relies on electrical current flow from the penetrating instrument, i.e., needle 17, to an electrical contact through the specific layer in which the tip of the needle is present. Only the needle tip 18 is conductive. Therefore, a specific layer 12 can be identified as being solely in contact with the needle and hence the needle location within the anatomical layers determined. The electrical current is provided by an external nerve stimulator attached to the needle or by an electrical potential provided by the sensor mechanism or outer conductive layer. The conductive and non-conductive layers that make up a simulated nerve can be formed such that they occur every few microns, providing needle detection in terms of depth to a few microns.

Sensor activation (by electrical conduction) is recorded, as is the magnitude of any current detected by the software. Knowledge of the specific electrical contact through which current is flowing will indicate the depth and position to which the needle has penetrated. The recorded magnitude of the current and the specific position of the needle can therefore be used by the software to produce an on screen simulation of the appropriate muscle response, for example, flexing of the wrist.

FIG. 1 illustrates the system in operation. A nerve stimulator device 19 is connected to the simulator by means of electrical contact 20 and procedural needle 17. A current will flow from the needle 17 to the electrical contact 20 when the needle is within a conductive layer of the simulator. The electronic interface board housed within base 21 identifies this layer. A PC or laptop 22 connected to the base 21 then interprets the detected layer and its current as a specific nerve location and patient response. The specific response is then displayed in real time on the PC display 23.

We claim:

1. A simulator for training medical practitioners in the administration of local and regional anaesthetic and analgesic substances, comprising:

a. a mannequin comprising:
      i. a simulated skin otiter cover comprising a conductive elastomer;
      ii. simulated muscle tissue;
      iii. at least one simulated fluid vessel segment;
      iv. at least one simulated conductive elastomer element; and
      v. at least one simulated nerve contained in the conductive elastomer element;

b. an instrument configured to penetrate the mannequin and such that upon penetration the instrument is at a position inside the mannequin;

c. a sensor system within the mannequin capable of determining the position of the instrument inside the mannequin and of producing information regarding said position; and d. a display system capable of representing information regarding the position of the instrument inside the mannequin;

e. whereby the sensor system transmits the information to the display system.

2. The simulator of claim 1 in which the sensor system comprises at least one simulated nerve comprising a plurality of substantially concentrically arranged alternating conducting and insulation layers connected in such a manner that at least one complete circuit provides information to the computer regarding the position of the instrument.

3. The simulator of claim 2 in which the sensor system generates a warning if the instrument is positioned within the innermost substantially concentrically arranged alternating conducting and insulating layer.

4. The simulator of claim 1 in which all portions of the mannequin are replaceable.

5. The simulator of claim 1 in which at least one simulated fluid vessel segment simulates a circulatory vessel.

6. The simulator of claim 5 in which at least one simulated circulatory vessel contains fluid and is connected hydraulically to a pump, whereby pulsating blood flow is simulated.

7. The simulator of claim 1 in which the instrument is selected from the group: a needle; an electrode; a scalpel; a catheter.

* * * * *